United States Patent [19]

Briar et al.

[11] Patent Number: 4,566,891
[45] Date of Patent: Jan. 28, 1986

[54] FIN COOLER CLAMP

[75] Inventors: Thomas J. Briar, Trafford; William H. Retsch, Castle Shannon, both of Pa.

[73] Assignee: PPG Industries, Inc., Pittsburgh, Pa.

[21] Appl. No.: 686,169

[22] Filed: Dec. 24, 1984

[51] Int. Cl.⁴ .............................................. C03B 37/02
[52] U.S. Cl. ......................................... 65/12; 24/490; 24/514; 24/573; 65/27; 65/172
[58] Field of Search .................. 24/514, 490, 573; 65/12, 27, 172

[56] References Cited

U.S. PATENT DOCUMENTS

| | | | |
|---|---|---|---|
| 2,908,036 | 10/1959 | Russell . | |
| 3,475,148 | 10/1969 | Higginbotham | 65/27 X |
| 3,670,291 | 6/1972 | Garcia | 24/573 X |
| 3,997,309 | 12/1976 | Harris | 65/12 |
| 4,150,937 | 4/1979 | Pelagio et al. | 65/12 X |
| 4,326,871 | 4/1982 | Harris | 65/12 |

OTHER PUBLICATIONS

"The Manufacturing Technology of Continuous Glass Fibers", 1973, Elsevier Publishing Company, pp. 106-110.

*Primary Examiner*—Robert Lindsay
*Attorney, Agent, or Firm*—John E. Curley

[57] ABSTRACT

A fin cooler clamp useable to quickly release and attach a fin cooler to a bushing frame is disclosed. A fin support bracket having a downwardly acing U-shaped channel is attachable to the bushing frame. A fin adjusting housing snap fits into the channel and can be quickly removed therefrom. A fin attaching block is adjustably carried at the forward end of the fin adjusting housing, and a fin block, to which the header block of the fin cooler is secured, is attached to the fin attaching block. Adjusting screws are provided to vary the inclination of the cooling fins, to tilt the fins from a vertical plane and to move the fin cooler along the length of the bushing assembly in either direction.

20 Claims, 18 Drawing Figures

FIN COOLER CLAMP

FIELD OF THE INVENTION

The present invention is directed generally to a fin cooler clamp. More particularly, the present invention is directed to an adjustable fin cooler clamp. Mose specifically, the present invention is directed to a quick release, adjustable fin cooler clamp for securing a fin cooler beneath a glass fiber forming bushing. A fin support bracket is attachable to the bushing frame of a glass fiber forming bushing assembly. A fin adjusting housing is releasably carried by the fin support bracket so that it can readily be snapped into place or removed. A fin cooler is attached to a fin block positioned at the foreward end of a fin attaching block which is adjustably supported by the fin adjusting housing. This fin block includes adjusting means so that the fin cooler can be moved horizontally along the bushing assembly. Additionally free ends of the cooling fins can be raised or lowered, and the fin cooler can be rotated about a central horizontal axis to angle the fins with respect to a vertical plane.

DESCRIPTION OF THE PRIOR ART

In the formation of glass fiber filaments and strands, molten glass is passed through a bushing which includes a tip plate that has a large number of tips or nozzles which are orifices through which the molten glass passes dividing the molten glass into a plurality of individual streams. Typically, cones of molten glass are formed on the undersurface of the tip plate at each of the openings or tips and a glass fiber is continuously pulled from each of these cones. The resulting filaments are then typically gathered into a strand and collected on a winder surface or in some instances the strand is fed to a chopper to produce discrete lengths of strands. Cooling of the glass fibers or filaments at the bushing in the cone area is facilitated by the placement of a plurality of fin cooler assemblies beneath, and closely adjacent the undersurface of the tip plate. These generally well known fin coolers include header blocks, which may have coolant liquid flowing through them, and a plurality of cooling fins which extend out from the header block, generally in a horizontal plane and generally perpendicular to the length of the elongated rectangular tip plate. A typical fin cooler is shown in U.S. Pat. 2,908,036.

Fin cooler assemblies frequently must be taken down from their use location beneath the bushing tip plates for cleaning, repair, or for adjustment of the fin geometry caused by tip plate deformation or warping. The means for securing the fin cooler assemblies to the bushings must be secure yet quickly releasable. A generally permanent nut and bolt connection is usually not suitable for this application since such a connection would not be quickly and readily undone. The high operating temperature in the glass fiber forming area in combination with the glass volatiles that are released during glass fiber formation, together with the presence of cooling water sprays and the like combine to render a conventional nut and bolt attachment of the fin coolers to the bushing assembly unacceptable.

As is well known to those familiar with this technology, the means frequently used to secure fin cooler assemblies to the bushing frame are vice grip clamps. In a typical glass forming facility several vice grips will be needed to attach each fin cooler to the bushing frame. With the advent of large bushing assemblies having 2000, 4000 or even as many as 6000 forming tips, it can readily be appreciated that a very large number of vice grip clamps are required to attach all of the fin cooler assemblies to a bushing frame required for cooling glass emanating from such a large number of tips. Such a large number of clamps are expensive and still have several drawbacks.

Vice grip clamps do not provide any ready means to adjust the fin cooler's position. Only by removal of the clamp, shifting of the fin cooler header block or adjustment of the fins by bending, and reattachment of the vice grip clamp can any positional adjustment to the fin cooler be made. Such adjustments are generally limited to movement of the fin cooler in a generally horizontal plane beneath the bushing. These problems are discussed by K. L. Lowenstein in his book, "The Manufacturing Technology of Continuous Glass Fibers", Elsevier Scientific Publishing Company, N.Y., 1973 on pages 106 through 110. No satisfactory provision is made for vertical adjustment of the free ends of the cooling fins using the vice grips commonly employed.

Each time the vice grip clamps are released and the fin cooler assembly taken down, its return to useage must be accompanied by careful repositioning. Once the vice grips have been taken off, they must be carefully adjusted and reinstalled with the fin cooler when it is put back in place to avoid contact with the bushing tips. There is no presently available means for quickly taking down a fin cooler and insuring that it will be returned to the same location.

Further, the vice grip clamps now used to attach the fin coolers to the bushing frames extend down below the bushing into the glass fiber forming area and block air flow to the bushings. It is common practice to condition the bushing environment by blowing air across the bottom of the bushing area. This blowing of air flow effects bushing temperatures and may cause temperature variations along the bushing and consequently affect the fiber forming process. Additionally, the vice grip clamps since they are in the glass fiber forming area, are apt to pick up contaminants and the like which may adversely affect their operation.

There is thus a need for a fin cooler clamp assembly which allows quick release of the fin cooler from the bushing frame, which allows the fin cooler to be reattached to the bushing frame at the exact location of its removal, that supports the fin cooler so that it can be quickly adjusted in various directions, and that does not interfere with operation of the glass fiber forming bushing assembly or its cooperating fin cooler when it is being adjusted.

SUMMARY OF THE INVENTION

It is an object of the present invention to provide a fin cooler clamp.

Another object of the present invention is to provide a quick release fin cooler clamp.

A further object of the present invention is to provide a quick release, screw adjustable, fin cooler clamp.

Yet another object of the present invention is to provide a fin cooler clamp which allows fin cooler placement adjustment.

Still a further object of the present invention is to provide a fin cooler clamp which allows the removed fin cooler to be returned to the exact same location.

Yet still another object of the present invention is to provide a fin cooler clamp that allows fin cooler placement adjustment during bushing operation.

Still yet a further object of the present invention is to provide a fin cooler clamp that does not adversely affect bushing operation.

As will be discussed in greater detail in connection with the description of the preferred embodiments which is set forth subsequently, the fin cooler clamp in accordance with the present invention includes a fin support bracket which is attached to the bushing frame, a fin adjusting housing which snap fits into the fin support bracket and a fin attaching block through which the fin cooler is attached to the fin adjusting housing. Various adjusting means are provided, as will be discussed herein in greater detail. These adjusting means allow the fin cooler that is attached to the fin cooler clamp to move along the length of the bushing, to pivot the free ends of the fins about a horizontal axis which is generally parallel to the elongated fin header block and the length of the bushing, and to angle the cooling fins with respect to the vertical plane and generally about a horizontal axis perpendicular to the length of the header block and the bushing assembly.

The fin cooler clamp in accordance with the present invention allows the fin cooler assembly which is attached to the clamp to be quickly snapped out of position beneath the bushing frame. An elongated adjusting handle or wrench can be used to snap the fin adjusting housing out of the fin support bracket. The cooling fins can then be adjusted, repaired, cleaned or otherwise serviced and the fin cooler can then be replaced in the fin support bracket in the same location that it was removed from. The ease of operation and savings of time provided by this fin cooler clamp increases plant productivity and reduces bushing down time since little time is needed to remove a fin cooler and to return it to its same location.

The various adjustment capabilities of the fin cooler clamp in accordance with the present invention allow each fin cooler assembly to be accurately and optimally positioned with respect to the bushing assembly with which it is operating. Since the spacing between the glass fiber filaments being formed and the cooling fins which remove heat from these filaments has a substantial effect on cooling rates, the ability to closely and accurately adjust cooling fin to strand distances is an important one. In contrast to the relatively rough adjustment provided by the prior art vice grip clamps, the fin cooler clamp in accordance with the present invention provides fast, accurate fin cooler positioning.

The fin cooler clamp assembly of this invention is quite compact and takes up little space. In contrast to the prior vice grip clamps, it does not extend down below the bushing assembly and does not interfere with cooling air flow to the bushing. Since it is quite unobtrusive, it also does not become as coated with the various glass volatiles that are apt to be given off during bushing operation or vice grips commonly used. The fin cooler clamp assembly thus stays relatively clean and accessible.

It will thus be seen that the fin cooler clamp assembly in accordance with the present invention allows quick release and replacement of fin coolers, provides for the fin adjustment of the fin cooler's placement once it is secured beneath the bushing, and does not interfere with bushing operation. The clamp assembly is durable, simple to operate, dependable, unobtrusive and is much more satisfactory than the prior vice grip clamp arrangements which it replaces.

BRIEF DESCRIPTION OF THE DRAWINGS

While the novel features of the fin cooler clamp assembly in accordance with the present invention are set forth with particularity in the appended claims, a full and complete understanding of the invention may be had by referring to the detailed description of the preferred embodiments as set forth hereinafter, and as may be seen in the accompanying drawings in which:

DESCRIPTION OF THE PREFERRED EMBODIMENTS

Figure 1:
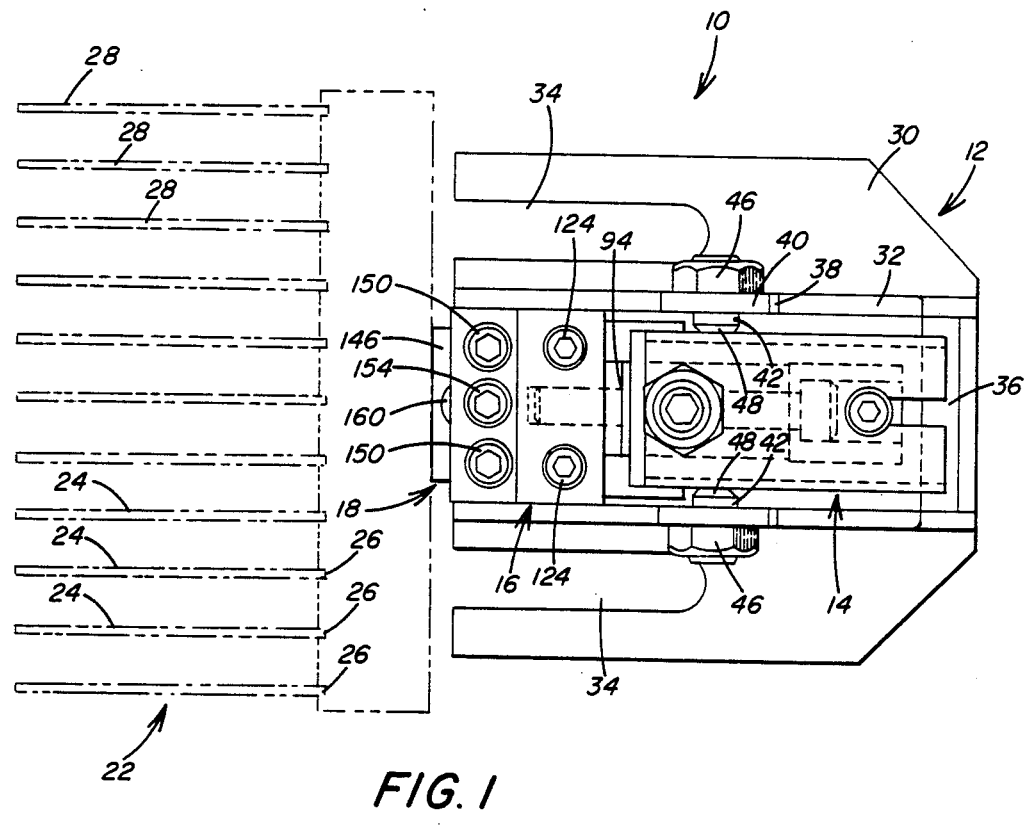
FIG. 1 is a bottom plan view of a first preferred embodiment of a fin cooler clamp in accordance with the present invention.

Turning initially to FIG. 1, there may be seen generally at 10 a first preferred embodiment of a fin cooler clamp assembly in accordance with the present invention. Fin cooler clamp assembly is comprised generally of a fin support bracket 12 which is attachable beneath a bushing assembly, a fin adjusting housing 14 which snap fits into fin support bracket 12; a fin attaching block 16 carried generally at the front of fin adjusting housing 14, and a fin block 18, seen more clearly in FIG. 2 to which is secured the header block 20 of a fin cooler, generally at 22. Fin cooler 22 is generally conventional in structure and operation and includes a plurality of cooling fins 24 which extend outwardly from header block 20, being generally in the shape of flat elongated rectangular metal plates being attached at first ends 26 to header block 20 and being generally perpendicular thereto with free ends 28 being supported away from header block 20 in a cantilever manner. Header block 20 is attachable to fin block 18 by any suitable means, such as by the use of silver solder to join fin cooler clamp 10 to fin cooler 22.

Figure 5:
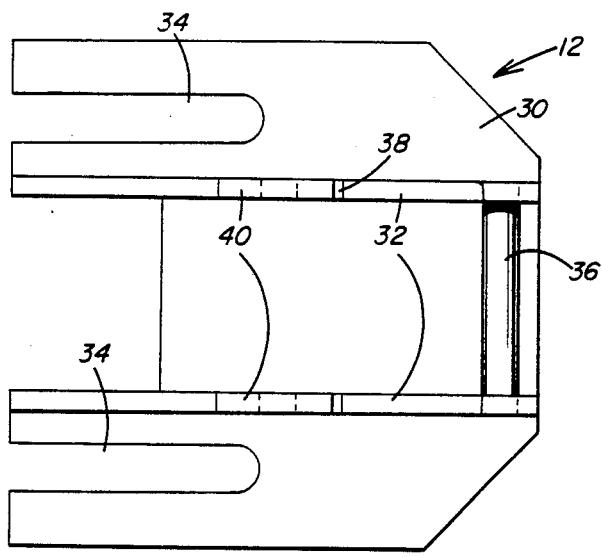
FIG. 5 is a bottom plan view of the fin support bracket portion of the fin cooler clamp of the present invention.
Figure 6:
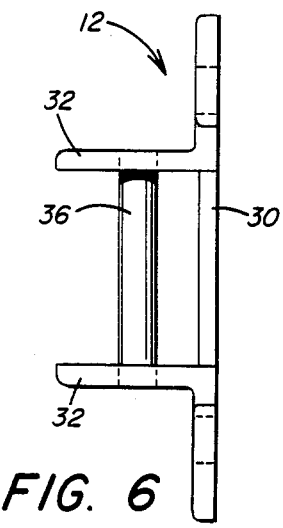
FIG. 6 is an end view of the fin support bracket of FIG. 5.
Figure 7:
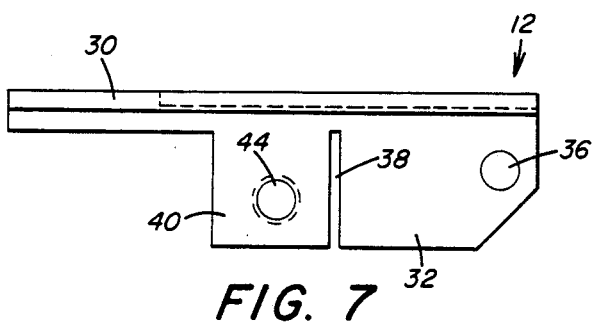
FIG. 7 is a side elevation view of the fin support bracket of FIG. 5.

Referring again to FIG. 1 in conjunction with FIGS. 5, 6 and 7, the fin support bracket 12 may be seen as having a generally planar base 30 that is generally rectangular and carries a pair of spaced, downwardly extending flanges 32. Flanges 32 are generally parallel to, and coplanar with the cooling fins 24 of fin cooler 22. Fin support bracket base 30 includes a pair of elongated spaced slots 34 at the forward end of base 30. Fin support bracket 12 is securable beneath a bushing assembly (not shown) by passage of suitable bolts through bracket slots 34 and into the bushing's frame. These elongated slots 34 allow gross positioning of the fin cooler clamp 10 in a bushing assembly. Bracket base 30 and flanges 32 cooperate to define a generally inverted U-shaped channel that is closed at its rear portion by a transverse rod 36. As will be discussed hereinafter in greater detail, rod 36 secures the rear portion of fin adjusting housing 14 in fin support bracket 12.

Fin support bracket flanges 32 are partially divided by elongated slits 38 which are perpendicular to base 30. The portions of the flanges 32 ahead of slits 38 form spring arms 40. Clamp bolts 42 extend through threaded apertures 44 in spring arms 40 and are held by clamp nuts 46. The inner ends of clamp bolts 42 which are located within the inverted U-shaped channel portion of fin support bracket 12 are rounded, as seen at 48 in FIG. 1 and bear against the fin adjusting housing 14.

Figure 8:
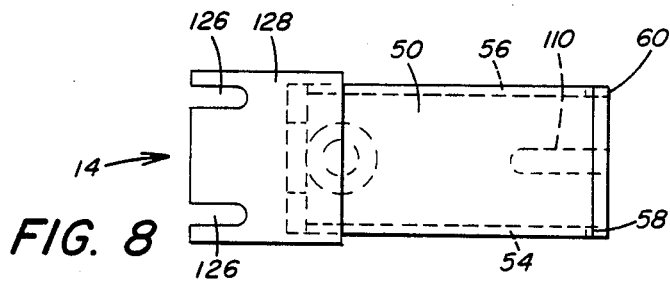
FIG. 8 is a top plan view of the fin adjusting housing of the first preferred embodiment of the fin cooler clamp in accordance with the present invention.
Figure 10:
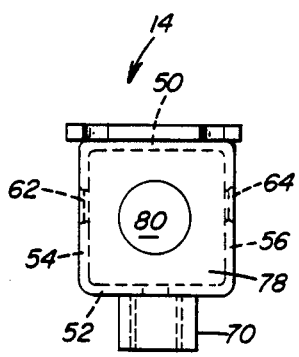
FIG. 10 is an end view of the fin adjusting housing of FIG. 8.
Figure 9:
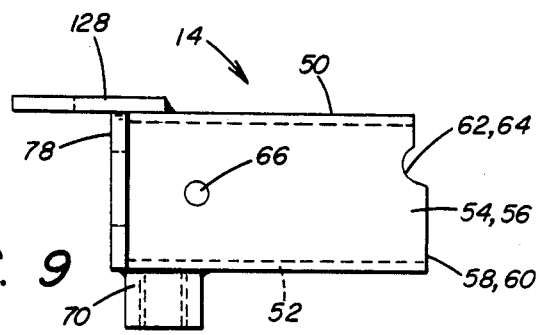
FIG. 9 is a side elevation view of the fin adjusting housing of FIG. 8.

Fin adjusting housing 14 may be seen separated from the rest of fin cooler clamp assembly 10 most clearly in FIGS. 8, 9 and 10. This housing is generally in the form of a hollow rectangular tube that is comprised of a top surface 50, a bottom surface 52 and spaced generally vertical side walls 54 and 56. The rear portions 58 and 60 of side walls 54 and 56 are provided with generally semi-circular recesses 62 and 64, respectively, located intermediate top and bottom walls 50 and 52. It should be noted that the rear portions 58 and 60 of side walls 54 and 56 are offset to the front above semi-circular cut outs 62 and 64, respectively, as may be seen most clearly in FIGS. 2 and 9. When fin adjusting housing 14 is placed within the inverted U-shaped channel in fin support bracket 12 so that side walls 54 and 56 are adjacent to flanges 32 on bracket 12, the semi-circular recesses 62 and 64 seat against the transverse rod 36 which extends between flanges 32. Spaced detents 66 are formed on side walls 54 and 56 of fin adjusting housing 14 and receive the rounded ends 48 of clamp bolts 42. Since these clamp bolts 42 are carried by spring arms 40 of flanges 32, they positively seat in detents 66. The combination of transverse rod 36 being received in cut outs 62 and 64 with round ends 48 of clamp bolts 42 being seated in detents 66 acts to secure fin adjusting housing 14 in fin support bracket 12 in a positive, secure, yet readily releasable manner. The force exerted by clamp bolts 42 can be adjusted by backing off clamp nuts 46 and repositioning clamp bolts 42 in threaded apertures 44.

Figure 4:
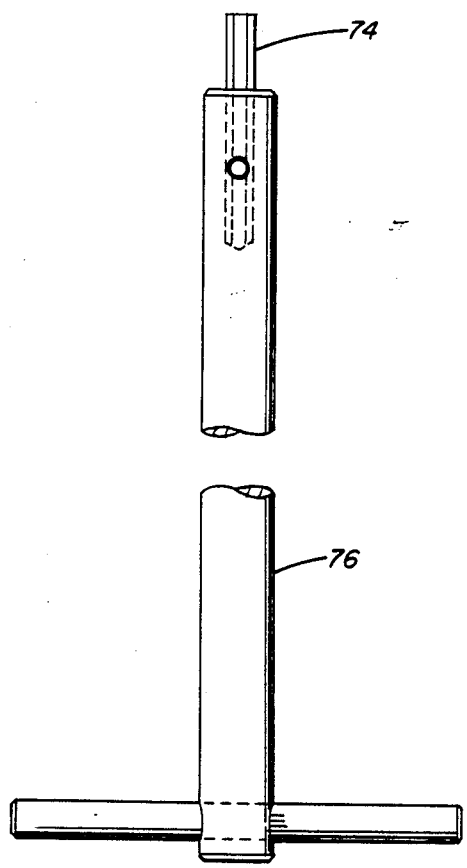
FIG. 4 is a plan view of an adjusting handle for use with the fin cooler clamp in accordance with the present invention.

An installing screw 68 is secured in a threaded cylinder 70 that is welded to the bottom surface 52 of fin adjusting housing 14. Installing screw 68 has an inner recesses hex head 72 that is sized to receive the end of an allen key head 74 carried at a first end of a generally T-shaped wrench 76, which is seen in FIG. 4. Wrench 76 is intended for use in snapping fin adjusting housing 14 into and out of fin support bracket 12 by placement of wrench head 74 into recess 72 in installing screw 68.

Fin adjusting housing 14 includes a vertical front wall 78 that is provided with a central aperture 80. As may be seen in FIG. 2, an elongated threaded cap screw 82 having an enlarged head 84 is placed within a cylindrical spacer sleeve 86 after a rear adjusting sleeve 88 has been placed about elongated cap screw 82. Rear adjusting sleeve 88 has an inwardly extending peripheral flange 90 at one end with flange 90 abutting head 84 of cap screw 82. The threaded shank 92 of elongated cap screw 82 passes through aperture 80 in front wall 78 of fin adjusting housing 14 and also through spaced pairs of spherical washers 94 and 96 placed on either side of front wall 78 concentrically with aperture 80. A coil spring 98 overlies spacer 86 with its ends bearing against spherical washer pair 96 and peripheral flange 90 of rear adjusting sleeve 88.

Figure 11:
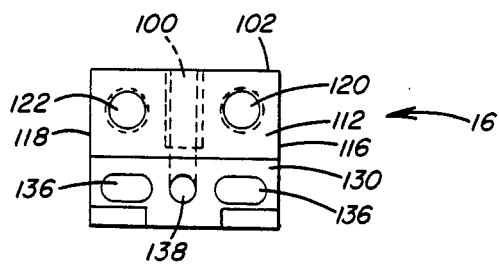
FIG. 11 is a top plan view of the fin attaching block of the first preferred embodiment of the fin cooler clamp in accordance with the present invention.
Figure 12:
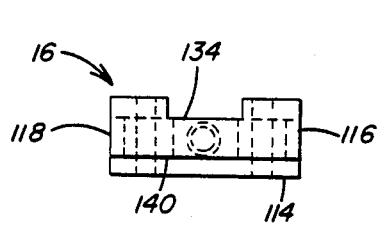
FIG. 12 is an end view of the fin attaching block of FIG. 11.
Figure 13:
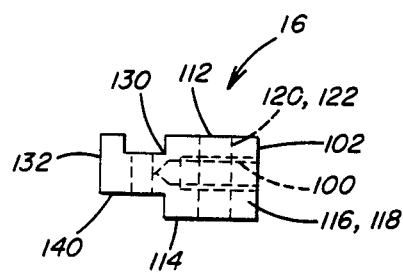
FIG. 13 is a side view of the fin attaching block of FIG. 11.

The threaded shank 92 of elongated cap screw 82 is received in a threaded bore 100 in fin attaching block 16, as may be seen in FIGS. 11, 12 and 13. In assembly, elongated cap screw 82 is first placed through rear adjusting sleeve 88 and then spacer sleeve 86 is slid over the threaded shank 92. Spring 98 is then placed over spacer sleeve 86 and one set of spherical washers 96 are slid over shank 92 and abut the end of spring 98. This assembly is then inserted within the hollow fin adjusting housing 14 with the shank 92 of elongated cap screw 82 passing through aperture 80 in front wall 78 of fin adjusting housing 14. The second set of spherical washers 94 are placed about shank 92 on the forward side of wall 78 of fin adjusting housing 14, and shank 92 is screwed into threaded bore 100 formed in the rear wall 102 of fin attaching block 16. An externally threaded, rear adjusting screw 104, having an unthreaded band 106 intermediate its end, is carried in a threaded hole 108 in rear adjusting sleeve. As elongated cap screw 82 is slid into fin adjusting housing 14, the unthreaded band 106 portion of rear adjusting screw 104 is snugly received in an open ended slot 110 in bottom wall 52 of fin adjusting housing 14. Slot 110 and band 106 are dimensioned to allow rear adjusting screw 104 to turn while preventing it from moving vertically in slot 110.

Rear adjusting screw 104 can be engaged and rotated by handle 76 thereby causing rear adjusting sleeve 88 to move vertically within fin adjusting housing 14. Elongated cap screw 82, which carries rear adjusting sleeve 88 at its head end, thus pivots about spherical washer sets 94 and 96 thereby causing fin attaching block carried at its threaded, opposite end to also move vertically. Since fin cooler 22 is secured to fin attaching block 16 through fin block 18, a vertical movement of rear adjusting sleeve 88 will result in an opposite vertical direction movement of free ends 28 of cooling fins 24.

Figure 2:
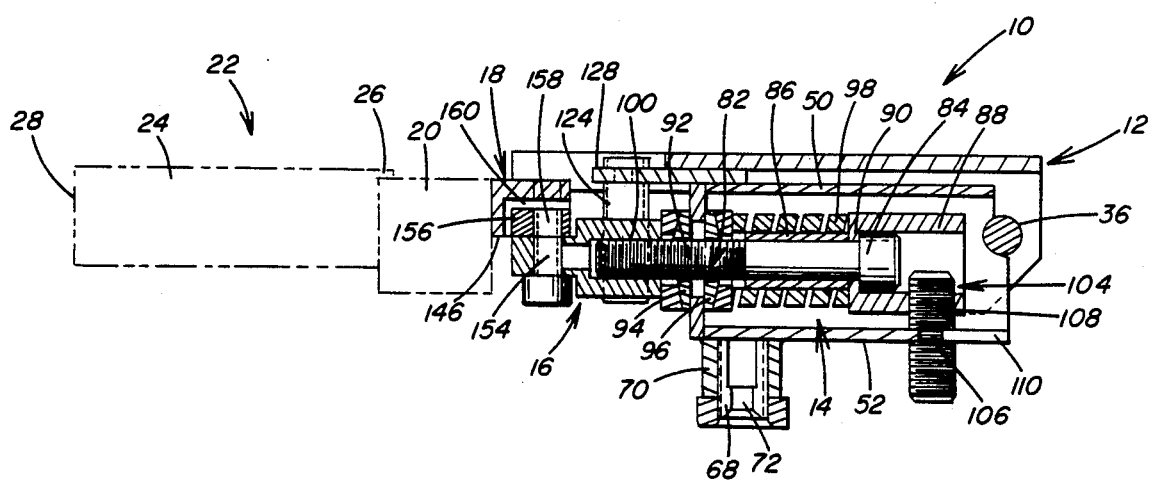
FIG. 2 is a side elevation view, partly in section, of the fin cooler clamp of FIG. 1.
Figure 3:
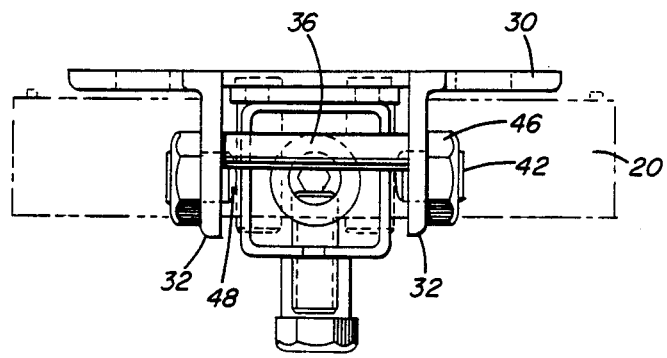
FIG. 3 is an end view of the fin cooler clamp of FIG. 1.

Referring against to FIGS. 1 and 2 as well as FIGS. 11-13, fin attaching block, generally at 16, is a generally rectangular metal element having a top side 112, a bottom side 114, and side surfaces 116 and 118. As was previously discussed, a threaded bore 100 extends into fin attaching block 16 from a rear wall 102. A pair of threaded spaced through bores 120 and 122 pass through fin attaching block 16 from the top side 112 to the bottom side 114 and are spaced on either side of threaded bore 100. As seen in FIGS. 1 and 2, these threaded through bores 120 and 122 receive front, externally threaded, adjusting screws 124. These screws 124 are similar to rear adjusting screw 104 and also have intermediate unthreaded annular bands which are receivable in open ended spaced top slots 126 formed in a leading portion of a forwardly projecting tongue 128 secured by suitable means such as welding to top surface 50 of fin adjusting housing 14. Front adjusting screws 124 are intended to be use to vary the angle of deviation of the cooling fins 24 from a vertical plane. Thus these screws are adjusted in an opposed, serial manner by moving one screw 124 in one direction and the opposed screw 124 in the opposite direction. This causes fin attaching block 16 and fin block 18 to rotate about a horizontal axis that is the longitudinal axis for elongated cap screw 82. As the front adjusting screws 124 are rotated by wrench 76 the cooling fins 24 move out of a vertical planar orientation and inclined enclosed to this vertical plane.

Fin attaching block 16 is provided with a transverse channel 130 in its upper side 112. Transverse channel 130 extends between side surfaces 116 and 118 and is placed in fin attaching block 16 ahead of threaded through bores 120 and 122. A front wall 132 of fin attaching block 16 has a central cut-out 134 which is formed having the same depth as transverse channel 130. Cut-out 134 joins the channel 130 to form a somewhat T-shaped recess in the upper surface 112 of fin attaching block 16. A pair of oval apertures 136 are formed in the fin attaching block 16 and pass from the bottom surface 114 of block 16 through to the transverse channel 130. These oval apertures are generally aligned with, and ahead of threaded bores 120 and 122. A central aperture 138 is also formed in block 16 and is spaced between oval apertures 136. A lower undercut 140 is formed in bottom surface 114 of fin attaching block 16. This above-described structure of the forward portion of fin attaching block 16 facilitates its cooperation with fin block 18 as will now be discussed.

Figure 14:
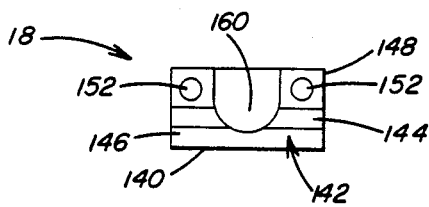
FIG. 14 is a bottom plan view of the fin block of the first preferred embodiment of the fin cooler clamp in accordance with the present invention.
Figure 15:
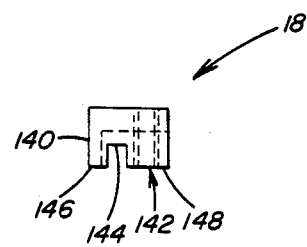
FIG. 15 is a side view of the fin block of FIG. 14.

Fin block 18 is shown as part of the fin cooler clamp 10 in FIGS. 1 and 2 and is shown individually in FIGS. 14 and 15. Fin block 18 is a generally rectangular metal block and includes a front face 140 to which the rear surface of header block is attached by silver solder or the like. A bottom portion 142 of fin block 18 includes a traverse aperture 144 that separates the bottom 142 into a front lip 146 and a rear segment 148. Rear segment is generally the same width as transverse channel 130 in fin attaching block 16 so that, as may be seen in FIGS. 1 and 2, fin block 18 is slidably supported above fin attaching block 16 with rear segment 148 of fin block 18 being placed in transverse channel 130 in fin attaching block 16. Front lip 146 of fin block 18 overhangs the front walls 132 of fin attaching block so that fin block 18 is slideable along fin cooler clamp 10 to move fin cooler 22 generally in either direction along the longitudinal axis of header block 20 or, alternatively stated, along the length of the elongated bushing tip plate.

A pair of short cap screws 150 pass through unthreaded oval apertures 136 in fin attaching block 16 are received in threaded holes 152 located in rear segment 148 of bottom portion 142 of fin block 18 and passing vertically therethrough. An adjusting cap screw 154 passes through central aperture 138 in fin attaching block. A cam disk 156 is securely attached to a shank end 158 of adjusting cap screw 154. Cam disk 156 rides in a generally semi-circular cam chamber 160 located in the bottom rear segment 148 of fin block 18, as may be seen in FIG. 14. With short cap screws 150 loosened, rotation of adjusting cap screw 154 will cause cam disk 156 to rotate in cam chamber 160 so that fin block 18 will slide transversely of fin attaching block. Once the fin cooler attached to fin block has been properly located by using of adjusting cap screw 154, the short cap screws 150 can be retightened.

It will be seen that the fin cooler clamp as discussed above allows the fin cooler to be readily repositioned. The complete assembly is first positioned by sliding base 12 on the bushing frame through the use of slots 34 until the fins extend out under the tip plate the proper distance. The inclination of the fins is adjustable through the use of rear adjusting screw 104 to raise or lower the tips 28 of fins. Angling of the fins from a vertical plane is accomplished through the use of front adjusting screws 124 while adjusting cap screw 154 can be used to slide the fin cooler along the length of the bushing. To make a vertical adjustment of the fins, screws 104 and 124 are turned either clockwise or counterclockwise the same number of turns for a given distance of vertical movement. All of these adjustments are accomplishable by using wrench 76 since all of the cap screws have internal hex heads sized to accept the wrench head 74 secured to the end of wrench 76.

Figure 16:
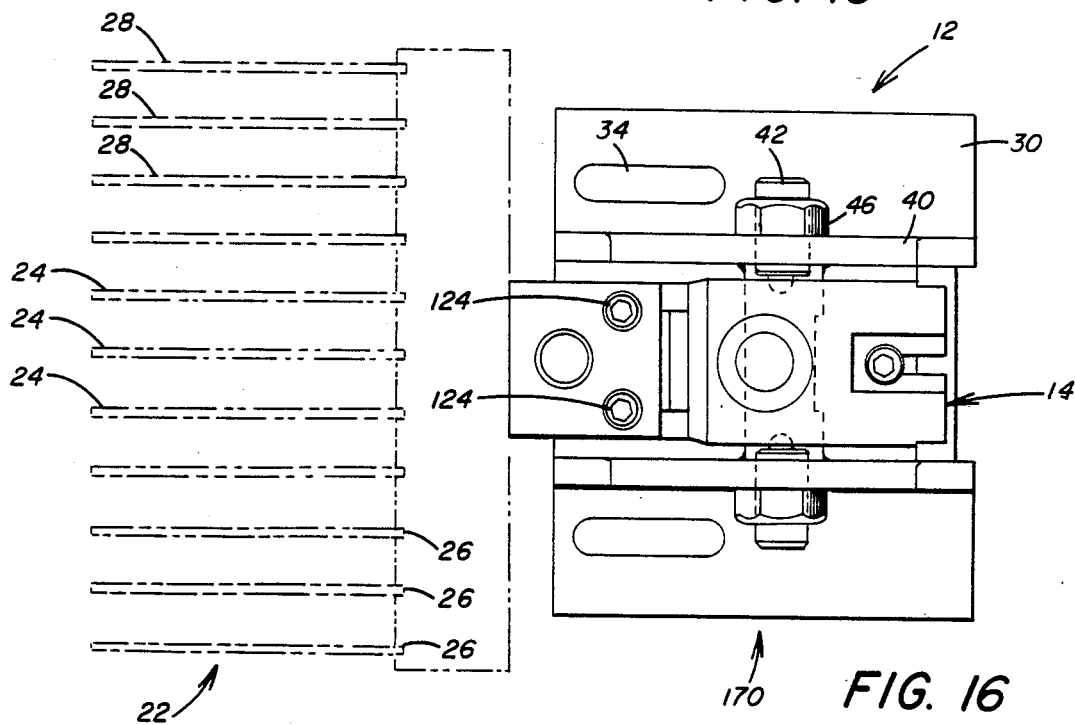
FIG. 16 is a bottom plan view of a second preferred embodiment of a fin cooler clamp in accordance with the present invention.
Figure 17:
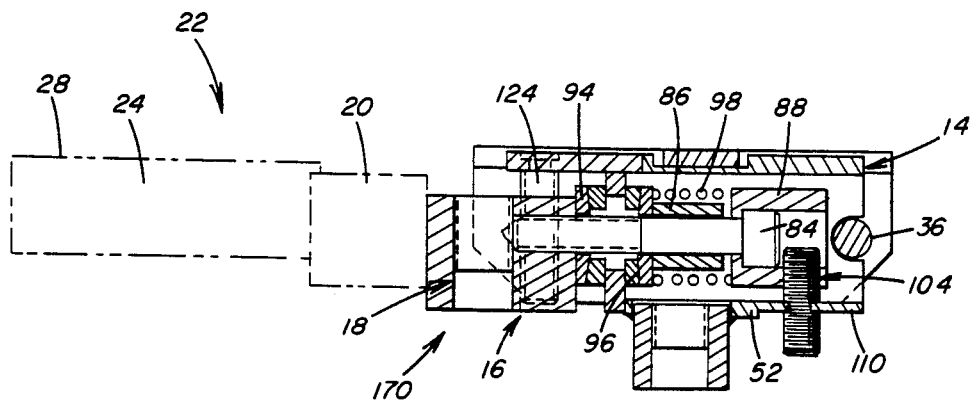
FIG. 17 is a side elevation view, partly in section, of the fin cooler clamp of FIG. 16.
Figure 18:
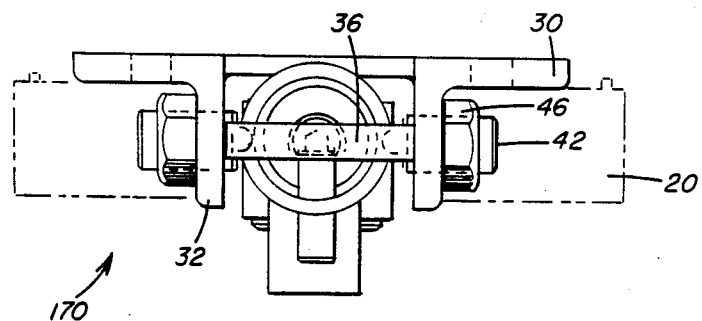
FIG. 18 is an end view of the fin cooler clamp of FIG. 16.

A second preferred embodiment of fin cooler clamp is shown generally at 170 in FIGS. 16, 17 and 18. Clamp 170 is essentially a simplified variant of clamp 10 with the major difference being that clamp assembly 170 does not include a separate fin block which is slideable to move the fin cooler along the length of the bushing assembly. Other than that, the two clamps are structured essentially the same and operate in the same manner. Like numbers are used to identify like parts in both of the clamps. It will be noted that in clamp 170 the fin adjusting housing 14 is cylindrical as opposed to the rectangular shape shown with reference to clamp 10. Either shape is acceptable.

Since these fin cool clamp asemblies as shown at 10 and 170 will be positioned in a high temperature environment where they may come into contact with various contaminants and the like, it is important that the parts and assemblies be treated to prevent binding or seizing. This is accomplished by coating all of the sliding surfaces and the screw threads with nuclear grade Never-Seez antiseizing and lubricating compound. This insures that the clamp assemblies will not bend or seize during operation.

While preferred embodiments of a fin cooler clamp in accordance with the present invention are set forth fully and completely hereinabove, it will be obvious to one of skill in the art that a number of changes in, for example, the sizes of the various cap screws, the overall shape of the support bracket, the size of the fin cooler, and the like could be made without departing from the true spirit and scope of the present invention which is accordingly to be limited only the following claims.

We claim:

1. A fin cooler clamp assembly useable to releasably and adjustable secure a fin cooler having a plurality of spaced cooling fins attached at first ends to an elongated header block beneath an elongated glass fiber forming bushing, said fin cooler clamp assembly comprising:

a fin support bracket attachable to a bushing frame generally beneath the bushing, said fin support bracket including a generally inverted U-shaped channel;

a fin adjusting housing releasably positionable within said U-shaped channel;

a fin attaching block attached to a forward portion of said fin adjusting housing; and a fin block attached to said fin attaching block, said header block being secured to said fin block.

2. The fin cooler clamp assembly of claim 1, wherein said fin support bracket includes a generally planar base plate and a pair of spaced, downwardly directed flanges, said flanges and said base plate cooperating to form said U-shaped channel.

3. The fin cooler clamp assembly of claim 2, wherein a transverse rod extends between rear portions of said spaced flanges.

4. The fin cooler clamp assembly of claim 3, wherein opposed clamp bolts are adjustably secured through said flanges intermediate end portions of said flanges and extend inwardly into said U-shaped channel.

5. The fin cooler clamp assembly of claim 4, wherein said fin adjusting housing is positionable between said flanges with said transverse rod being seated in a recess in a rear portion of said fin adjusting housing and with said clamp bolts engaging side portions of said fin adjusting housing whereby said fin adjusting housing snap fits within said U-shaped channel.

6. The fin cooler clamp assembly of claim 1, wherein said fin adjusting housing includes an elongted hollow housing having an apertured front wall.

7. The fin cooler clamp assembly of claim 6, wherein an elongated cap screw is positioned within said hollow housing, carries a rear adjusting sleeve at a head end, and has a threaded shank that extends through said apertured front wall and engages said fin attaching block.

8. The fin cooler clamp assembly of claim 7, where said portion of said threaded shank within said housing caries an encircling spacer sleeve and an concentric coil spring.

9. The fin cooler clamp assembly of claim 8, wherein spherical washer pairs are placed on both sides of said apertured front wall about said threaded shank of said elongated cap screw.

10. The fin cooler clamp assembly of claim 9, wherein said coil spring bears against said rear adjusting sleeve at one end and against said spherical washer pair disposed within said housing at a second end.

11. The fin cooler clamp assembly of claim 7, wherein a rear adjusting screw is carried by said housing and is received in said rear adjusting sleeve.

12. The fin cooler clamp assembly of claim 11, wherein said rear adjusting screw is rotatable in said housing to pivot said elongated cap screw in said apertured front wall to raise or lower tip portions of said cooling fins.

13. The fin cooler clamp assembly of claim 6, wherein said elongated hollow housing includes a forwardly projecting tongue that extends forwardly beyond said apertured front wall.

14. The fin cooler clamp assembly of claim 13, wherein said fin attaching block carries spaced front adjusting screws.

15. The fin cooler clamp assembly of claim 14, wherein said front adjusting screws are rotatably secured in said forwardly projecting tongue.

16. The fin cooler clamp assembly of claim 15, wherein said fin attaching block is pivotably attached to said fin adjusting housing and further wherein rotation of said front adjusting screws varies the orientation of said cooling fins from a vertical plane.

17. The fin cooler clamp assembly of claim 1, wherein said fin block is slideably attached to said fin attaching block and is capable of movement along the length of said bushing.

18. The fin cooler clamp of claim 17, wherein said fin block includes a generally semi-circular cam chamber.

19. The fin cooler clamp assembly of claim 18, wherein a cam disk is carried in said cam chamber by an adjusting cap screw.

20. The fin cooler clamp assembly of claim 19, wherein said adjusting cap screw is carried by said fin attaching block whereby rotation of said adjusting cap screw effects transverse movement of said fin cooler along said bushing.

* * * * *